(12) United States Patent
Dooley et al.

(10) Patent No.: US 7,416,626 B2
(45) Date of Patent: Aug. 26, 2008

(54) TRIM PANEL WITH EDGE SEAL

(75) Inventors: David J. Dooley, Troy, MI (US); Robert J. Adams, Ypsilanti, MI (US); Glenn A. Cowelchuk, Chesterfield Township, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 179 days.

(21) Appl. No.: 11/161,837

(22) Filed: Aug. 18, 2005

(65) Prior Publication Data

US 2007/0042157 A1  Feb. 22, 2007

(51) Int. Cl.
*B32B 37/00* (2006.01)

(52) U.S. Cl. .................. 156/204; 156/202; 156/216; 156/223; 156/227

(58) Field of Classification Search .............. 156/202, 156/204, 212, 216, 222, 223, 227; 296/1.08
See application file for complete search history.

(56) References Cited

U.S. PATENT DOCUMENTS

| 4,434,598 | A | * | 3/1984 | Adell | ............ 52/716.5 |
| 4,986,865 | A | * | 1/1991 | Fujii | ............ 156/214 |
| 5,535,571 | A | | 7/1996 | Nichols | |
| 5,635,003 | A | * | 6/1997 | Phelps | ............ 156/222 |
| 5,718,791 | A | | 2/1998 | Spengler | |
| 5,938,887 | A | | 8/1999 | Reynolds et al. | |
| 5,941,590 | A | | 8/1999 | Reynolds et al. | |
| 6,524,510 | B2 | * | 2/2003 | Spengler | ............ 264/248 |
| 6,893,077 | B1 | | 5/2005 | Dejongh | |
| 2004/0217523 | A1 | | 11/2004 | Benninger | |

* cited by examiner

*Primary Examiner*—Jeff H Aftergut
(74) *Attorney, Agent, or Firm*—Brooks Kushamn P.C.

(57) ABSTRACT

A trim part for use with a vehicle includes a substrate and a trim cover overlaying the substrate. The trim cover has first and second portions that are folded together to form a flexible edge seal that is engageable with the vehicle. A method of making such a trim part is also disclosed.

20 Claims, 3 Drawing Sheets

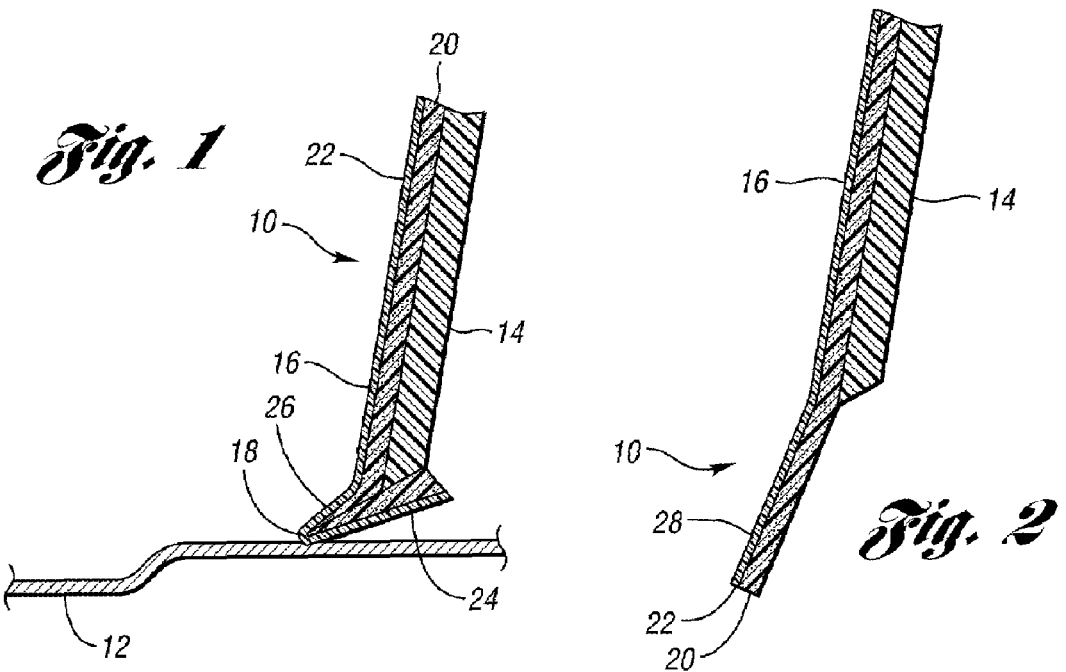
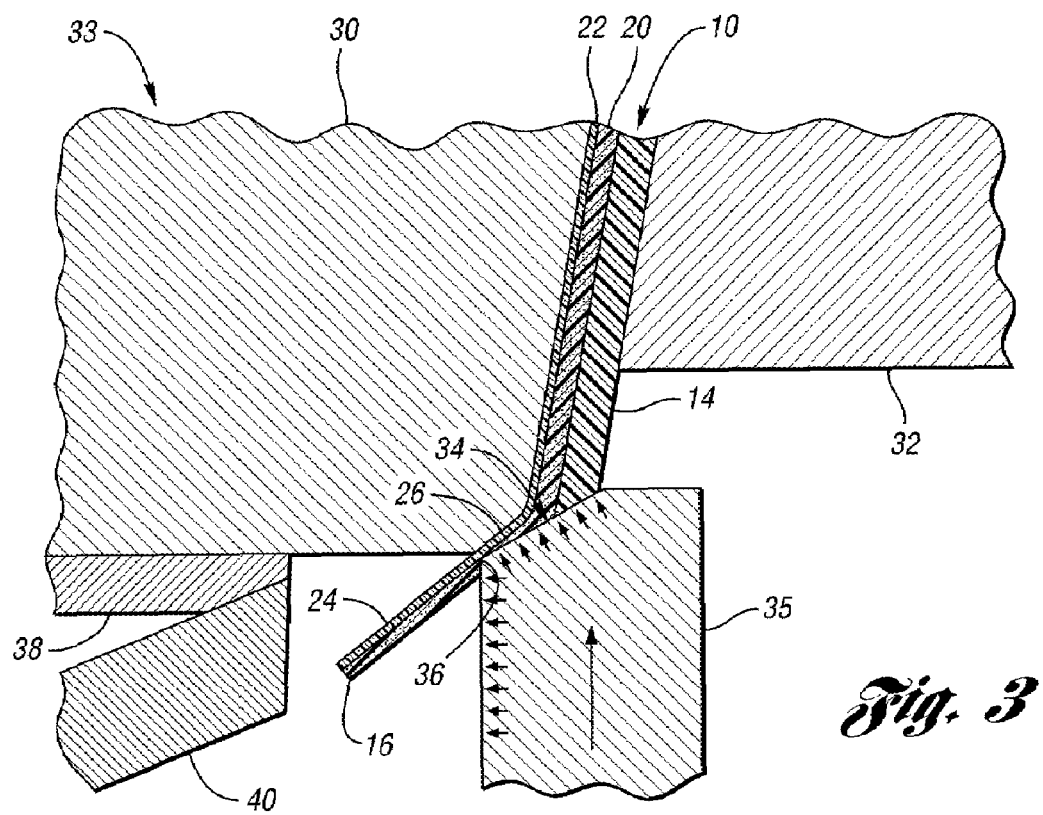

TRIM PANEL WITH EDGE SEAL

BACKGROUND OF THE INVENTION

1. Field of the Invention

The invention relates to a trim panel for use with a motor vehicle, and to a method of making such a trim panel.

2. Background Art

A trim panel may include a substrate and a trim cover attached to the substrate. Examples of trim panels are disclosed in U.S. Pat. No. 5,718,791 and U.S. Patent Application Publication No. US 2004/0217523 A1.

SUMMARY OF THE INVENTION

Under the invention, a trim part for use with a vehicle is provided. In one embodiment, the trim part includes a substrate and a trim cover overlaying the substrate. Furthermore, the trim cover has first and second portions that are folded together to form a flexible edge seal that is engageable with the vehicle.

Further under the invention, a method of making a trim part for use with a vehicle is provided. The method includes positioning a trim cover on a substrate, and folding together first and second portions of the trim cover to form a flexible edge seal.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a fragmentary cross-sectional view of a trim panel mounted on sheet metal of a vehicle body, wherein the trim panel includes a trim cover attached to a substrate, and the trim cover includes an edge seal engaged with the sheet metal;

FIG. 2 is a fragmentary cross-sectional view of the trim panel showing an extension of the trim cover in an unfolded state, wherein the extension is used to form the edge seal;

FIG. 3 is a fragmentary cross-sectional view of the trim panel positioned in a holding fixture, and showing a heated mold surface engaged with a portion of the trim cover;

DETAILED DESCRIPTION

Figure 4:
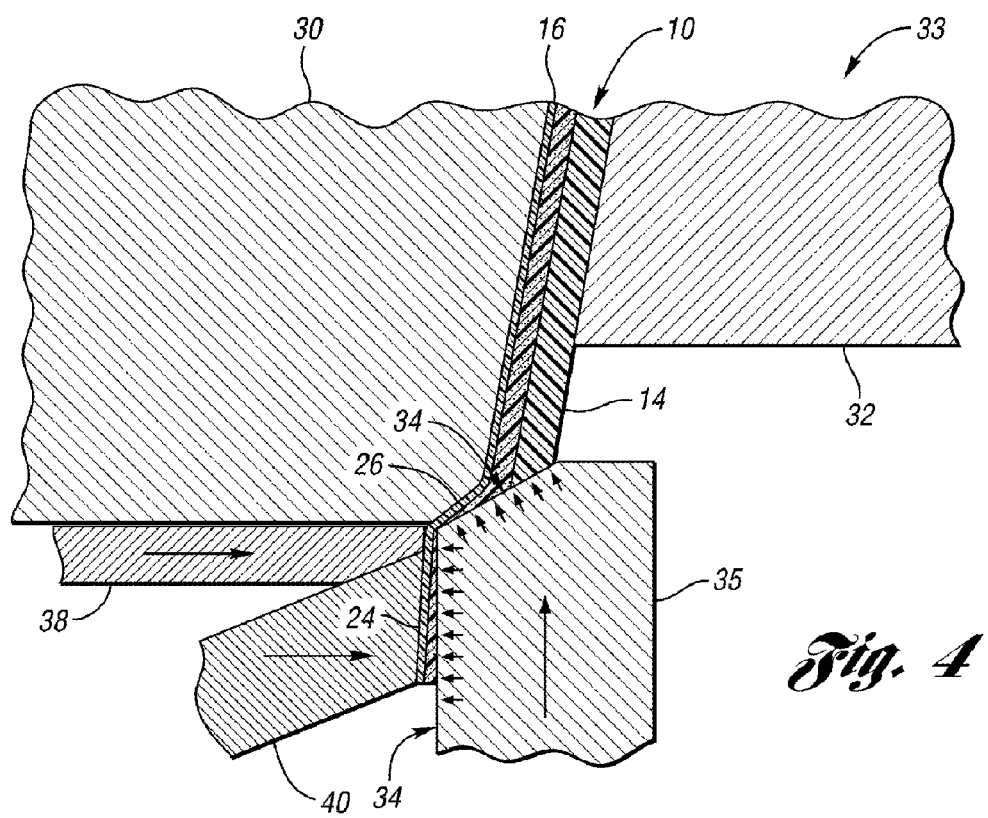
FIG. 4 is a fragmentary cross-sectional view of the trim panel positioned in the holding fixture, and showing first and second slides engaged with an additional portion of the trim cover to force the additional portion against the heated mold surface.

The following description is merely exemplary in nature, and is in no way intended to limit the invention or its application or uses.

FIG. 1 shows a trim part, such as a trim panel 10, according to the invention mounted against a vehicle part, such as a sheet metal vehicle body 12. The trim panel 10, which may be a door panel, instrument panel, headliner, or any other trim part, includes a substrate 14 and a trim cover 16 attached to the substrate 14. As shown in FIG. 1, the trim cover 16 has an edge seal 18 in contact with the vehicle body 12.

The substrate 14 may comprise any suitable material and may be made in any suitable manner. For example, the substrate 14 may comprise injection or compression molded plastic, such as polypropylene, acrylonitrile butadiene styrene, and/or thermoplastic olefin. In addition, the substrate 14 may be a single layer or multiple layers attached together in any suitable manner. Furthermore, the substrate 14 may have any suitable configuration, such as a planar configuration or a non-planar contoured configuration.

The trim cover 16 may also comprise any suitable material and may be made in any suitable manner. In addition, the trim cover 16 may include a single layer or multiple layers attached together in any suitable manner. For example, the trim cover 16 may include a padding layer 20, such as a foam layer, laminated to a coverstock or finish layer 22 that provides an appearance surface. The finish layer 22 may comprise any suitable material, such as a leather, fabric, and/or plastic.

As shown in FIG. 1, first and second portions 24 and 26, respectively, of the trim cover 16 are folded together to form the edge seal 18. With such a configuration, the edge seal 18 may be formed as a flexible seal that enables a relatively significant interference fit to be achieved with the vehicle body 12. As a result, gaps between the trim panel 10 and vehicle body 12, resulting from sheet metal and build variations, for example, may be significantly reduced or eliminated.

In the embodiment shown in FIG. 1, the edge seal 18 projects outwardly from an adjacent portion of the trim cover 16. The edge seal 18 may also extend at an angle greater than ninety degrees relative to the adjacent portion of the trim cover 16. Alternatively, the edge seal 18 may have any suitable configuration.

Referring to FIGS. 2-6, an exemplary method of making the trim panel 10 will now be described. First, the trim cover 16 may be attached to the substrate 14 in any suitable manner, such as by molding the substrate 14 onto the trim cover 16. Next, referring to FIG. 2, an extension 28 of the trim cover 16 may be trimmed to a desired length such that sufficient material is present to form the edge seal 18.

The trim panel 10 may then be positioned in a fixture such that the trim panel 10 is held firmly in place. For example, referring to FIG. 3, the trim panel 10 may be pressed between first and second sections 30 and 32, respectively, of a holding fixture 33. Next, a heat source may be used to heat one or both portions 24 and 26 of the trim cover 16. For example, a heated mold surface 34 of a heated tool 35 may be moved into contact with a back surface of the second portion 26 of the trim cover 16. As shown in FIG. 3, the tool 35 may also be used to define a fold line 36 in the trim cover 16. Referring to FIG. 4, one or more fold members, such as fold slides 38 and 40, may also be moved toward the tool 35 to press a back surface of the first portion 24 of the trim cover 16 against the mold surface 34.

Figure 5:
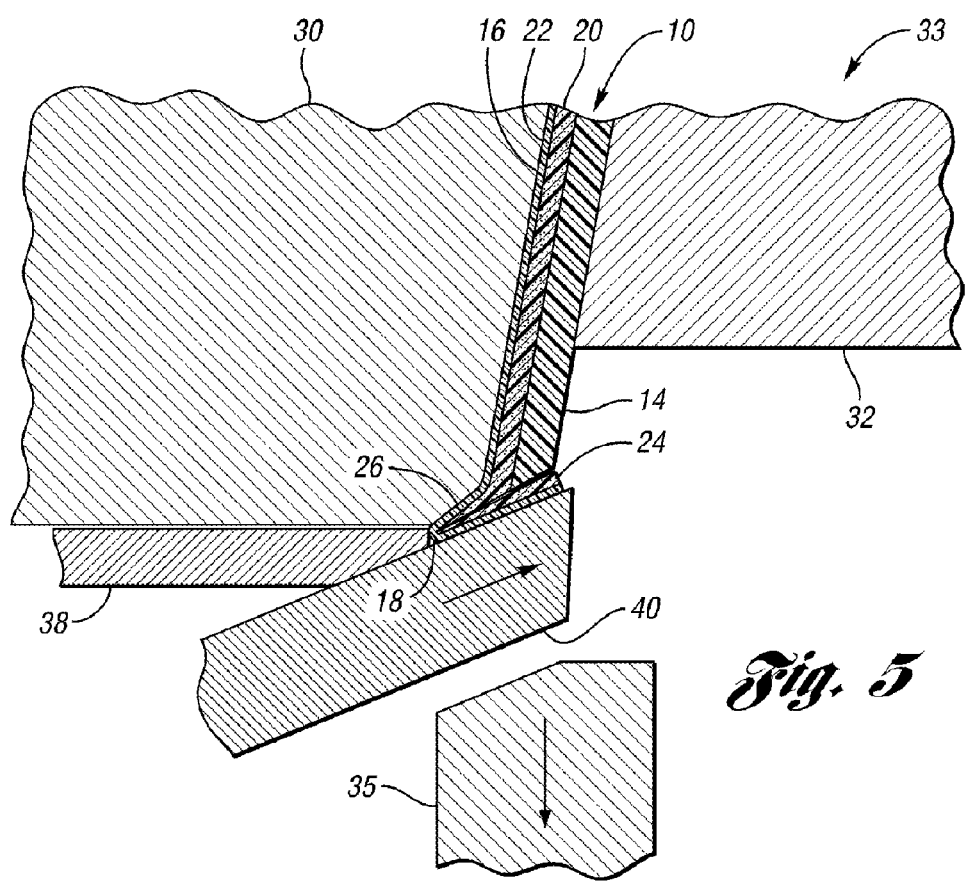
FIG. 5 is a fragmentary cross-sectional view of the trim panel positioned in the holding fixture, and showing one of the slides moved forwardly to fold together first and second portions of the trim cover to thereby form the edge seal.

After the back surfaces of one or both portions 24 and 26 of the trim cover 16 have been sufficiently heated, the tool 35 may be moved away from the trim panel 10. The fold slide 40 may then be used to fold the first portion 24 against the second portion 26 to form the edge seal 18, as shown in FIG. 5. A vacuum pressure may also be applied to the second portion 26 to hold the second portion 26 in place during the folding step. For example, a vacuum source (not shown) in communication with a surface of the holding fixture section 30 may be activated to draw the second portion 26 against the holding fixture section 30 prior to and during the folding step.

Figure 6:
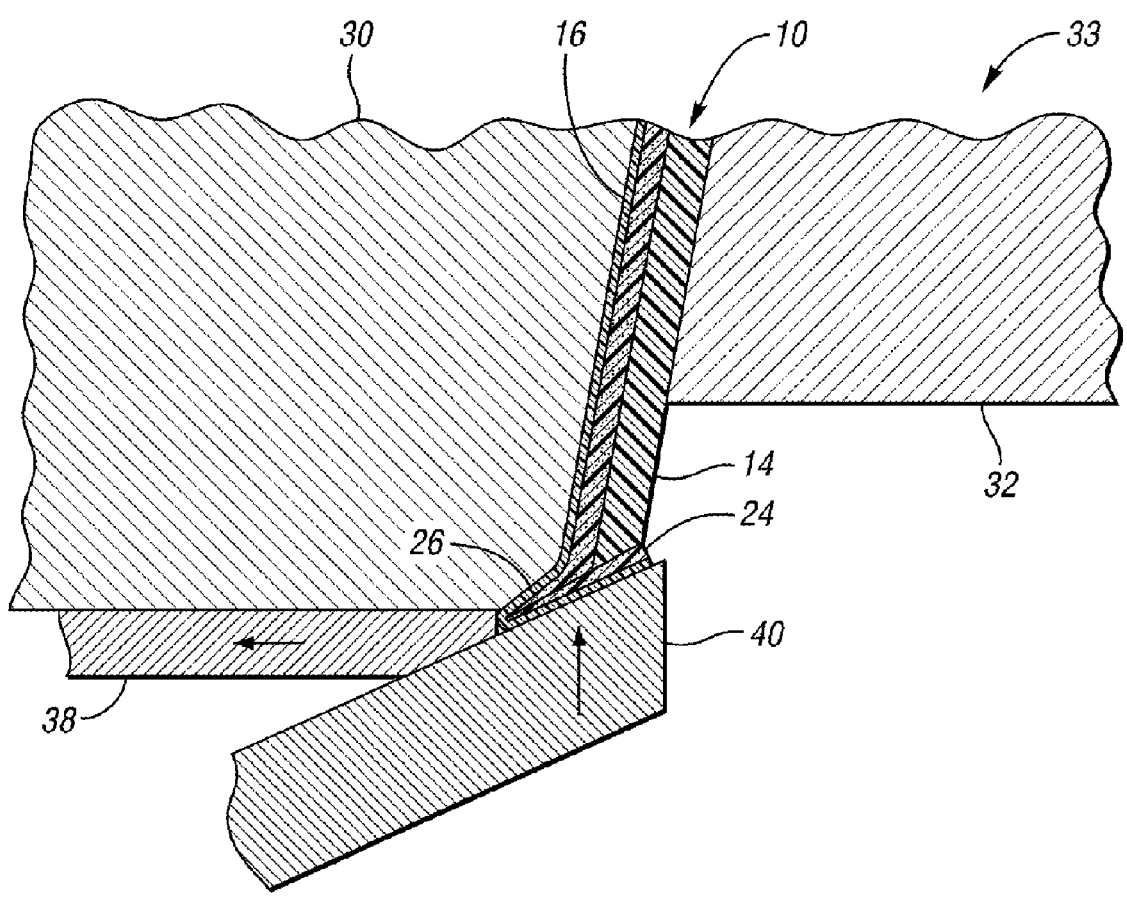
FIG. 6 is a fragmentary cross-sectional view of the trim panel positioned in the holding fixture, and showing the slides being used to press together the first and second portions of the trim cover.

During the folding step, the heated back surface of the first portion 24 may adhere to the back surface of the second portion 26 and to the substrate 14. For example, if the trim cover 16 comprises an underlying foam layer, the foam of the first portion 24 may adhere to the foam of the second portion 26 and to an edge of the substrate 14. Adhesive material may also be applied to one or both portions 24 and 26 to facilitate adhesion. Still further, the fold slide 40 may be moved toward the substrate 14 to press the first portion 24 against the second portion 26 and the substrate 14, as shown in FIG. 6, to thereby improve adhesion of the portions 24 and 26. Such movement of the fold slide 40 may also reduce the radius at the bend location of the trim cover 16.

Alternatively, the heating step may be eliminated if not required for a particular application. In such a case, an adhesive may be used, for example, to hold the portions 24 and 26 together.

The finished trim panel 10 may then be installed in the vehicle in any suitable manner, such as with fasteners and/or adhesive. During installation, the edge seal 18 may be compressed, flexed, bent, or otherwise reshaped upon engagement with the vehicle body 12, or other vehicle part. As a result, the edge seal 18 may be configured to provide a significant interference fit with the vehicle body 12, and thereby substantially reduce or eliminate gaps between the trim panel 10 and vehicle body 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making a trim part for use with a vehicle, the method comprising:
    positioning together a continuous trim cover and a substrate; and
    folding together first and second portions of the trim cover such that the first and second portions contact each other and form a flexible, outers edge seal, each of the first and second portions of the trim cover defining an outer surface portion of the trim part.

2. The method of claim 1 wherein the positioning step is performed prior to the folding step, the positioning step is performed such that the first portion of the trim cover is spaced away from the substrate, and the folding step is performed such that the first portion contacts the substrate.

3. The method of claim 1 wherein the trim cover includes a padding layer and a finish layer that provides an appearance surface.

4. The method of claim 1 further comprising heating the trim cover prior to the folding step.

5. The method of claim 4 further comprising at least partially defining a fold line in the trim cover during the heating step.

6. The method of claim 4 wherein the heating step comprises contacting a heated surface with a back surface of the trim cover.

7. The method of claim 1 wherein the folding step comprises contacting the first portion of the trim cover with a slide member, and sliding the slide member relative to the substrate.

8. The method of claim 7 further comprising applying a vacuum pressure through a holding fixture to the second portion of the trim cover to hold the second portion against the holding fixture, wherein the sliding step comprises sliding the slide member relative to the holding fixture.

9. The method of claim 1 wherein the trim cover includes a foam layer, and the first and second portions of the trim cover each include a portion of the foam layer.

10. The method of claim 9 wherein the folding step comprises folding together the first and second portions of the trim cover such that the portions of the foam layer contact each other.

11. The method of claim 1 wherein the edge seal is engageable with the vehicle.

12. The method of claim 1 wherein the trim cover includes a padding layer and a finish layer that provides an appearance surface, and the first and second portions of the trim cover each include a portion of each of the padding layer and the finish layer.

13. The method of claim 12 wherein the folding step comprises folding together the first and second portions of the trim cover such that the portions of the padding layer contact each other.

14. A method of making a trim part for use with a vehicle, the method comprising:
    attaching together a trim cover and a substrate, wherein the trim cover comprises a foam layer attached to a finish layer;
    positioning the trim cover and the substrate in a holding fixture;
    heating first and second portions of the foam layer of the trim cover; and
    folding together the first and second portions of the foam layer of the trim cover to form a flexible edge seal, such that the first portion of the foam layer contacts and adheres to the second portion of the foam layer and to the substrates;
    wherein after the attaching step and prior to the folding step, the first portion of the foam layer is spaced away from the substrate.

15. The method of claim 14 further comprising defining a fold line between the first and second portions of the foam layer.

16. The method of claim 15 wherein the heating step and the defining step are performed simultaneously.

17. The method of claim 14 wherein the trim cover comprises a continuous layer at the edge seal, and wherein the edge seal defines an outer surface portion of the trim part that is engageable with a component of the vehicle.

18. A method of making a trim part for use with a vehicle, the method comprising:
    positioning together a trim cover and a substrate such that a section of the trim cover extends beyond the substrate; and
    folding together first and second portions of the section of the trim cover such that the first and second portions contact each other and form an outwardly protruding, flexible, edge seal that is engageable with a component of the vehicle and that defines an outer surface portion of the trim part.

19. The method of claim 18 wherein the trim cover includes a padding layer and a continuous finish layer that provides an appearance surface, and the first and second portions of the trim cover each include a portion of each of the padding layer and the finish layer.

20. The method of claim 19 wherein the folding step comprises folding together the first and second portions of the trim cover such that the portions of the padding layer contact each other and such that the first portion of the trim cover contacts the substrate.

* * * * *

UNITED STATES PATENT AND TRADEMARK OFFICE
CERTIFICATE OF CORRECTION

PATENT NO. : 7,416,626 B2 Page 1 of 1
APPLICATION NO. : 11/161837
DATED : August 26, 2008
INVENTOR(S) : David J. Dooley et al.

It is certified that error appears in the above-identified patent and that said Letters Patent is hereby corrected as shown below:

Column 3, Line 34, Claim 1:

Delete "outers" and insert -- outer --.

Signed and Sealed this

Second Day of December, 2008

JON W. DUDAS
*Director of the United States Patent and Trademark Office*